United States Patent Office 3,546,190
Patented Dec. 8, 1970

3,546,190
COMPLEX COPPER CATALYZED POLYMERIZA-TION OF PYRROLE AND PYRROLE DERIVED COMPOUNDS
Louis de Vries, Richmond, Calif., assignor to Chevron Research Company, San Francisco, Calif., a corporation of Delaware
No Drawing. Filed Mar. 30, 1966, Ser. No. 538,534
Int. Cl. C08f 5/00
U.S. Cl. 260—88.3
1 Claim

ABSTRACT OF THE DISCLOSURE

Compounds having an acidic hydrogen bonded to carbon or nitrogen, wherein the carbon or nitrogen is bonded to carbon-to-carbon unsaturation, are polymerized to low order polymers with a complex copper containing catalyst.

---

This invention concerns a novel method for polymerizing organic compounds having acidic hydrogens to relatively low molecular weight polymers, using a complex copper containing catalyst.

Polyfunctional polymers of relatively low molecular weight find a variety of uses. Because the polymers are solids and have little or no vapor pressure below their decomposition temperature, the polyfunctionality can be used in various reactions, frequently in a catalytic manner, and then be readily separated from the products of the reaction. Moreover, the polymers themselves may be used with a variety of other polymers to form films, molded objects, etc., the polymeric additives providing advantageous properties.

It has now been found that organic compounds of from about 5 to 60 carbon atoms having an acidic hydrogen activated by $\beta,\gamma$-carbon-to-carbon unsaturation, i.e.,

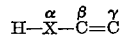

can be polymerized by contacting the organic compound with a complex cupric compound of the formula:

[(N-heterocycle)$_2$·CuCl$_2$·Cu(O-lower alkyl)$_2$]

The cupric ion is present in at least stoichiometric quantities.

The complex cupric compound will be considered first. The complex compound has the formula indicated above, where the N-heterocycle indicates a pyridine compound having from 5 to 12 carbon atoms, preferably with the nitrogen of the ring being sterically unhindered; the lower alkyl is alkyl of from 1 to 3 carbon atoms, preferably 1 carbon atom, i.e., methyl. The N-heterocycle includes pyridine, $\beta$ and $\gamma$ picoline, quinoline, isoquinoline, 4-tert.-butyl pyridine, etc. The preferred composition is that having pyridine as the heterocycle and methyl as the lower alkyl group, which has the following formula:

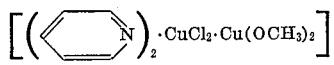

Turning now to a consideration of the organic compounds which may be polymerized. As already indicated, the compound must have an acidic hydrogen and $\beta,\gamma$ carbon-to-carbon unsaturation as indicated by the following formula:

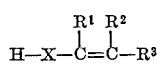

wherein X is nitrogen or carbon bonded to an electron withdrawing substituent and/or a substituent capable of resonating with a negative charge. R$^1$, R$^2$ and R$^3$ will generally be hydrogen or hydrocarbyl, while in addition R$^3$ may be taken together either with R$^1$ or a group bonded to X to form a ring. (Hydrocarbyl is a monovalent organic radical composed solely of carbon and hydrogen which may be aliphatic, alicyclic or aromatic, or combinations thereof, e.g., aralkyl.)

The compounds for the most part will be of from about 4 to 60 carbon atoms, more usually of from about 4 to 25 carbon atoms. The acidic proton will generally have an acidity constant of about 10–35 on the MSAD pKa scale. See Cram, Fundamentals of Carbanion Chemistry, Academic Press, New York, 1965, chapter I.

The group of compounds which has nitrogen heteroatoms will be of the following formula:

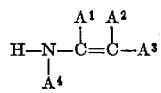

wherein A$^1$ is hydrogen or hydrocarbyl of from about 1 to 12 carbon atoms, more usually of from about 1 to 6 carbon atoms, A$^2$ is hydrogen or hydrocarbyl of from about 1 to 12 carbon atoms, more usually hydrogen and A$^3$ is hydrogen or hydrocarbyl of from about 1 to 12 carbon atoms, more usually of from about 1 to 6 carbon atoms and may be taken together with A$^1$ to form a carbocyclic aromatic ring or together with A$^4$ to form a pyrrole ring, and A$^4$ is hydrogen or hydrocarbyl of from 1 to 12 carbon atoms, preferably aromatic hydrocarbon of from 6 to 12 carbon atoms or as previously indicated, may be taken together with A$^3$ to form a pyrrole ring (vinylene radical). The molecule will generally have from about 4 to 25 carbon atoms.

The two major classes of amine compounds used in this invention are anilines and substituted anilines or pyrroles and substituted pyrroles. The aniline-type compounds have the following formula:

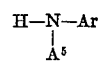

wherein Ar$^1$ is a carbocyclic aromatic hydrocarbon of from 6 to 20 carbon atoms, more usually of from 6 to 12 carbon atoms, and A$^5$ is hydrocarbyl of from 1 to 12 carbon atoms, more usually aromatic hydrocarbon of from 6 to 12 carbon atoms, or hydrogen.

Illustrative substituted anilines include naphthylphenylamine, diphenylamine, ditolylamine, methylaniline, cyclohexylphenylamine, 2,6-di(tert.-butyl) aniline, etc.

The pyrrole-type compounds will for the most part be within the following formula:

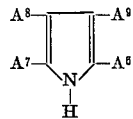

wherein A$^6$–A$^9$ may be hydrogen or aliphatic hydrocarbon of from 1 to 6 carbon atoms, preferably of from 1 to 3 carbon atoms and A$^6$ and A$^9$ may be taken together to form a benzene ring (A$^6$ and A$^9$ would be a butadienylidenyl radical). Preferably, A$^6$ and A$^7$ are lower alkyl of from 1 to 3 carbon atoms, i.e., methyl, ethyl, propyl and isopropyl.

The other category of compounds has the proton attached to carbon, the carbon atom being attached to at least one electron withdrawing group or a group which can resonate with the negative charge or carbanion and stabilize the charge. For the most part, these compounds will have the following formula:

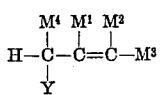

wherein M¹ and M² are hydrogen or hydrocarbyl of from about 1 to 8 carbon atoms, more usually of from about 1 to 3 carbon atoms, and M³ is hydrogen or hydrocarbyl of from 1 to 8 carbon atoms, more usually of from 1 to 3 carbon atoms and may be taken together with M¹ to form a carbocyclic aromatic ring (butadienylidenyl radical) or with Y to form a cyclopentadiene ring (vinylene radical);

M⁴ is hydrogen, hydrocarbyl of from 1 to 8 carbon atoms, more usually of from 1 to 3 carbon atoms, or an electron withdrawing group having non-oxo carbonyl or derivative thereof; that is, carboxyl compounds or compounds capable of being hydrolyzed to carboxyl compounds, e.g., esters, nitriles, amides, etc.;

Y is hydrogen, hydrocarbyl of from 1 to 8 carbon atoms, more usually of from 1 to 3 carbon atoms or an electron withdrawing group having a non-oxo carbonyl or derivative thereof (see definition of M⁴), e.g., cyano, and, as already indicated, may be taken together with M³ to form a cyclopentadiene ring.

The molecule will generally have a total of from 4 to 30 carbon atoms, more usually from 4 to 20 carbon atoms. The various non-oxo carbonyl groups which may be present are the alkoxycarbonyl (ester), carboxamide, and carboxylic acid or salt. Preferably, the latter two would not be used because of the high density of negative charge of the salt which would be present or formed by reaction with the pyridine of the catalyst.

The group having the acidic hydrogen bonded to carbon also may be divided into two broad categories: those having an electron withdrawing group bonded to carbon; and those being derived from cyclopentadiene. The first group for the most part will have the following formula:

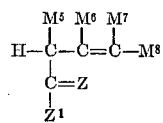

wherein M⁶ and M⁷ are hydrogen or aliphatic hydrocarbon radicals of from 1 to 6 carbon atoms, M⁸ is hydrogen, aliphatic hydrocarbon of from 1 to 6 carbon atoms or taken together with M⁶ butadienylidenyl radical forming a benzene ring with the intervening double bond, Z is O, N or NH and Z¹ is hydrocarbyloxy of from 1 to 12 carbon atoms (hydrocarbyl radical bonded to an oxygen), amino of from 0 to 12 carbon atoms (including —NH₂, hydrocarbylamino and dihydrocarbylamino; hydrocarbylamino being a hydrocarbyl radical bonded to amino nitrogen) or when Z is nitrogen (N) a bond from carbon to nitrogen to form a nitrile group; and M⁵ is hydrogen, alkyl of from 1 to 6 carbon atoms or

For the most part, M⁶ and M⁸ will be joined together to form a benzene ring and these compounds will have the following formula:

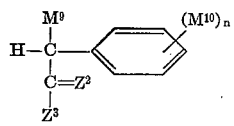

wherein M¹⁰ is lower alkyl of from 1 to 6 carbon atoms, n is an integer of from 0 to 2, Z² is oxygen or nitrogen, Z³ is hydrocarbyloxy of from 1 to 12 carbon atoms, amino, hydrocarbylamino or dihydrocarbylamino of from 1 to 12 carbon atoms and M⁹ is hydrogen, hydrocarbyl of from 1 to 6 carbon atoms, or

Illustrative compounds which come within the above formula are cyanovinylmethane, dicyanovinylmethane, diethylpropenylmalonate, diethylphenylmalonate, phenylacetonitrile, diphenylacetonitrile, tolylacetonitrile, phenyl diphenylacetate, triphenylmethane, diphenylacetamide, N,N,N',N'-tetramethyl phenylmalondiamide, etc.

The cyclopentadiene compounds will for the most part have the following formula:

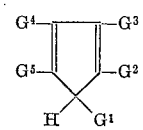

wherein G¹–G⁵ are hydrogen, or hydrocarbyl of from 1 to 12 carbon atoms, more usually alkyl of from 1 to 3 carbon atoms.

Illustrative compounds include cyclopentadiene, methylcyclopentadiene, butylcyclopentadiene, 2,5-dimethylcyclopentadiene, indene, etc.

The cupric complex used for the polymerization can be readily prepared by dissolving cupric chloride in methanol, usually to a concentration of from about 1 to 20 weight percent of cupric chloride. To this solution is then added alkali metal methoxide, e.g., sodium methoxide, in stoichiometric quantity. That is, since the cupric complex comprises one mole of cupric chloride to about one mole of cupric methoxide, one mole of alkali metal methoxide, usually sodium methoxide, is added per mole of cupric chloride. The methoxide is added slowly, generally with vigorous stirring.

When the addition of sodium methoxide is complete, pyridine is added in approximately molar quantity to the cupric ion present, although a slight excess (about 10 weight percent) may be used. The reaction mixture is then heated to reflux for a short time, generally in the range of about 5 to 30 minutes, and then the mixture is allowed to cool. The temperature at reflux is generally about 65° C., although temperatures in the range of about 50° C. to the reflux temperature may be used.

Upon the solvents cooling, the cupric complex product crystallizes out as large green crystals. The cupric complex product is easily isolated by filtration and then dried in vacuo. If desired, the cupric complex product may be washed with methanol before drying. See J. of Poly. Sci. 58 469–490 (1962) for description of the preparation of the complex cupric compound.

The polymerization of the monomers is easily carried out by dissolving the monomer either in a polar or non-polar solvent in the presence of the cupric complex and optionally additional base (addition to the pyridine present in the catalyst) and allowing the reaction to occur either at room temperature or a little below or heating to temperatures, generally not in excess of 50° C. That is, the temperature will generally range from about 0° to 50° C.

During the course of the reaction, in order to obtain complete or almost complete reaction of the monomer, at least a stoichiometric amount of cupric ion is necessary; that is, about one mole of the complex per mole of reactant. If desired, a small excess of the cupric complex may be used, usually not exceeding 50 mole percent excess; that is, about 1.5 moles of cupric complex per mole of reactant.

Any inert solvent or diluent may be used, such as alcohols, aromatic hydrocarbons, etc. and nitrogen bases, e.g., pyridine, picoline, triethylamine, etc., either as solvent or in conjunction with another solvent. The aromatic hydrocarbon will usually be used together with a nitrogen base as a mixed solvent. The nitrogen bases cannot be considered inert solvents in the classical sense, since they will react with the acidic organic compound to remove an acidic proton. However, in most instances, the extent of the equilibrium to form the pyridinium salt is relatively small, and the pyridine is predominantly in the base form. Since the removal of the proton aids the reaction, the nitrogen bases are preferred solvents.

Generally, the concentration of the reactant (acidic organic monomer) will range from about 1 to 100 parts per 100 parts of solvent. The concentration of the reactant is not critical to this invention and will be generally one of convenience.

For the most part, the reaction will be carried out in an inert atmosphere, e.g., nitrogen. This is generally necessary because of the highly unsaturated nature of the product. Polyolefinic compounds are well known to rapidly react with oxygen to form peroxidic compounds and the degradation products of peroxidic compounds.

The time for the reaction may vary from about one-half hour to 24 hours. The time is not a critical aspect of the process and is generally one of convenience, as long as a minimum time is employed.

The following examples are offered by way of illustration and not by way of limitation.

EXAMPLE A

Preparation of catalyst

Into a reaction flask containing 500 ml. of methanol was added 135 g. of cupric chloride. To this mixture was slowly added 54 g. of sodium methoxide in 500 ml. of methanol and the mixture heated to reflux. At the end of the addition, 98.0 g. of pyridine was added, the mixture heated at reflux for 2.5 hours and then allowed to cool. A green solid precipitated, which was isolated by filtration, washed with cold methanol and then dried in vacuo.

EXAMPLE I

Into a reaction flask was introduced 20.9 g. of the catalyst prepared as described in Example A, 90 ml. of dry pyridine, and 6.2 g. of diphenylamine. The vessel was flushed with nitrogen and then allowed to stand at room temperature for 28 hours. Water was then added to the reaction mixture and the aqueous solution extracted with benzene. The benzene layer was washed with dilute hydrochloric acid followed by washing with dilute sodium hydroxide. Repeated water washes were used until the water was neutral. Methanol was then added to the benzene solution precipitating the product which was dried in vacuo.

Analysis (percent): C, 82.84; H, 5.66; N, 8.02.

Following the procedure described above, a number of other compounds were polymerized in a similar manner. The following table indicates the conditions under which they were polymerized and properties of the resulting product.

TABLE I

| Example: | Monomer, grams | Cupric complex, gms. | Solvent ml. | $O_2/N_2$ [1] | Time,[2] hrs. | Analysis [3] C | H | N |
|---|---|---|---|---|---|---|---|---|
| II | 2,5-dimethylpyrrole, 10 | 48 | Benzene, 180 | $N_2$ | 28 | 60.3 | 5.9 | 10.57 |
| III | Cyclopentadiene, 5.6 | 27 | Benzene, 100 / Pyridine, 10 | $N_2$ | 40 | 65.78 | 5.85 | |
| IV | do | 27 | Pyridine, 100 | $N_2$ | 2 | 71.1 | 6.4 | |
| V | Allyl cyanide, 6.7 | 41.8 | Pyridine, 200 | $N_2$ | 3 | 41.75 | 4.7 | 8.1 |
| VI | Diethyl phenylmalonate, 11.6 | 20 | Pyridine, 50 | $N_2$ | 3 | 66.0 | 6.09 | |
| VII | Phenylacetonitrile, 6.0 | 21.6 | Pyridine, 100 | $N_2$ | 1 | 83.3 | 4.21 | 12.0 |
| VIII | Pyrrole, 6.7 | 41.9 | Benzene, 180 / Pyridine, 20 | $N_2$ | 28 | 54.6 | 4.00 | 14.64 |

[1] $O_2/N_2$ indicates whether air or an inert nitrogen atmosphere was used during the reaction.
[2] For these times, neither external heating nor cooling was used.
[3] The analyses frequently do not add up to 100% because of oxygen being absorbed by the product, the product being very reactive to oxygen forming peroxidic products.

The polymers as determined by molecular weight generally have on the average from about 2 to 10 monomer units, more usually from about 3 to 6 monomer units. Usually, the compositions obtained are solids, but infrequently are obtained as gums. Depending on the particular polymer, they will be soluble in a variety of different solvents.

The fact that the polymers having conjugated unsaturation, e.g., cyclopentadiene, indene, etc., do take up oxygen makes them useful as oxygen scavengers, as peroxidic sources, etc. Moreover, the polymer prepared from a pyrrole (Example II) is extremely tenacious as a chelating agent. It therefore can find use for ion exchange, for removing trace metals from solutions or in other situations where chelating agents are found useful.

Furthermore, those products which are polyfunctional, e.g., a plurality of carboxylic acid functionalities, provide solid catalysts which in the case of the carboxylic acids may be mild acidic catalysts or as their salts, mild basic catalysts.

As will be evident to those skilled in the art, various modifications on this invention can be made or followed, in the light of the foregoing disclosure and discussion, without departing from the spirit or scope of the disclosure or from the scope of the following claim.

I claim:
1. A method of preparing polymers of at least 2 monomeric units by contacting in the liquid phase in the presence of a diluent an acidic hydrogen-containing compound of the formula:

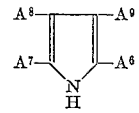

wherein $A^6$–$A^9$ are each hydrogen or aliphatic hydrocarbon of from 1 to 6 carbon atoms and $A^6$ and $A^9$ may be taken together to form a benzene ring and a compound of the formula:

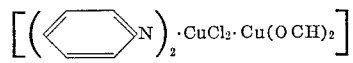

References Cited

Blanchard et al.: Journal of Polymer Science, vol. 58 (1962), pp. 473–480.

JOSEPH SCHOFER, Primary Examiner

R. A. GAITHER, Assistant Examiner

U.S. Cl. X.R.

260—2, 78.4, 88.7, 89.7, 93.1

PO-1050
(5/69)

UNITED STATES PATENT OFFICE
CERTIFICATE OF CORRECTION

Patent No. 3,546,190      Dated December 8, 1970

Inventor(s) LOUIS DE VRIES

It is certified that error appears in the above-identified patent and that said Letters Patent are hereby corrected as shown below:

Col. 6, in the second formula, "$(OCH)_2$" should read --$(OCH_3)_2$

Signed and sealed this 25th day of May 1971.

(SEAL)
Attest:

EDWARD M. FLETCHER, JR.
Attesting Officer

WILLIAM E. SCHUYLER, JR.
Commissioner of Patents